Patent …

United States Patent [19]
Keller

[11] 3,771,210
[45] Nov. 13, 1973

[54] METHOD FOR WELDING BELLOWS CONSTRUCTIONS AND THE LIKE

[75] Inventor: Anthony T. Keller, Pequannock, N.J.

[73] Assignee: Robertshaw Controls Company, Richmond, Va.

[22] Filed: Mar. 20, 1972

[21] Appl. No.: 236,503

Related U.S. Application Data

[62] Division of Ser. No. 17,172, March 6, 1970, Pat. No. 3,666,161.

[52] U.S. Cl. .................... 29/454, 29/493, 219/124
[51] Int. Cl. ............................................. B23p 19/04
[58] Field of Search ................. 29/25.13, 407, 454, 29/493; 219/124; 228/4, 5, 9, 44, 12

[56] References Cited
UNITED STATES PATENTS

| | | | |
|---|---|---|---|
| 1,630,622 | 5/1927 | Lea | 29/493 X |
| 2,390,596 | 12/1945 | Larsen | 29/493 UX |
| 2,605,537 | 8/1952 | Pityo et al. | 228/15 X |
| 2,798,146 | 7/1957 | November | 29/493 X |
| 3,100,256 | 8/1963 | Borg | 219/124 |
| 3,130,031 | 4/1964 | McMahon, Jr. et al. | 29/25.1 E X |

*Primary Examiner*—J. Spencer Overholser
*Assistant Examiner*—Ronald J. Shore
*Attorney*—James T. Candor

[57] ABSTRACT

Method and apparatus for welding together the internal diameters of two bellows members wherein the apparatus has a frame means carrying an indexible table having a fixture thereon, the fixture being adapted to receive and hold the bellows members with the internal diameters thereof in a position for being welded together. The table is indexed to cause the fixture to move from a loading station thereof to a welding station thereof adjacent welding means carried by the frame means. Automatic means causes the welding together of the internal diameters of the bellows members with the welding means while the members are disposed at the welding station.

10 Claims, 14 Drawing Figures

PATENTED NOV 13 1973 3,771,210

PATENTED NOV 13 1973 3,771,210

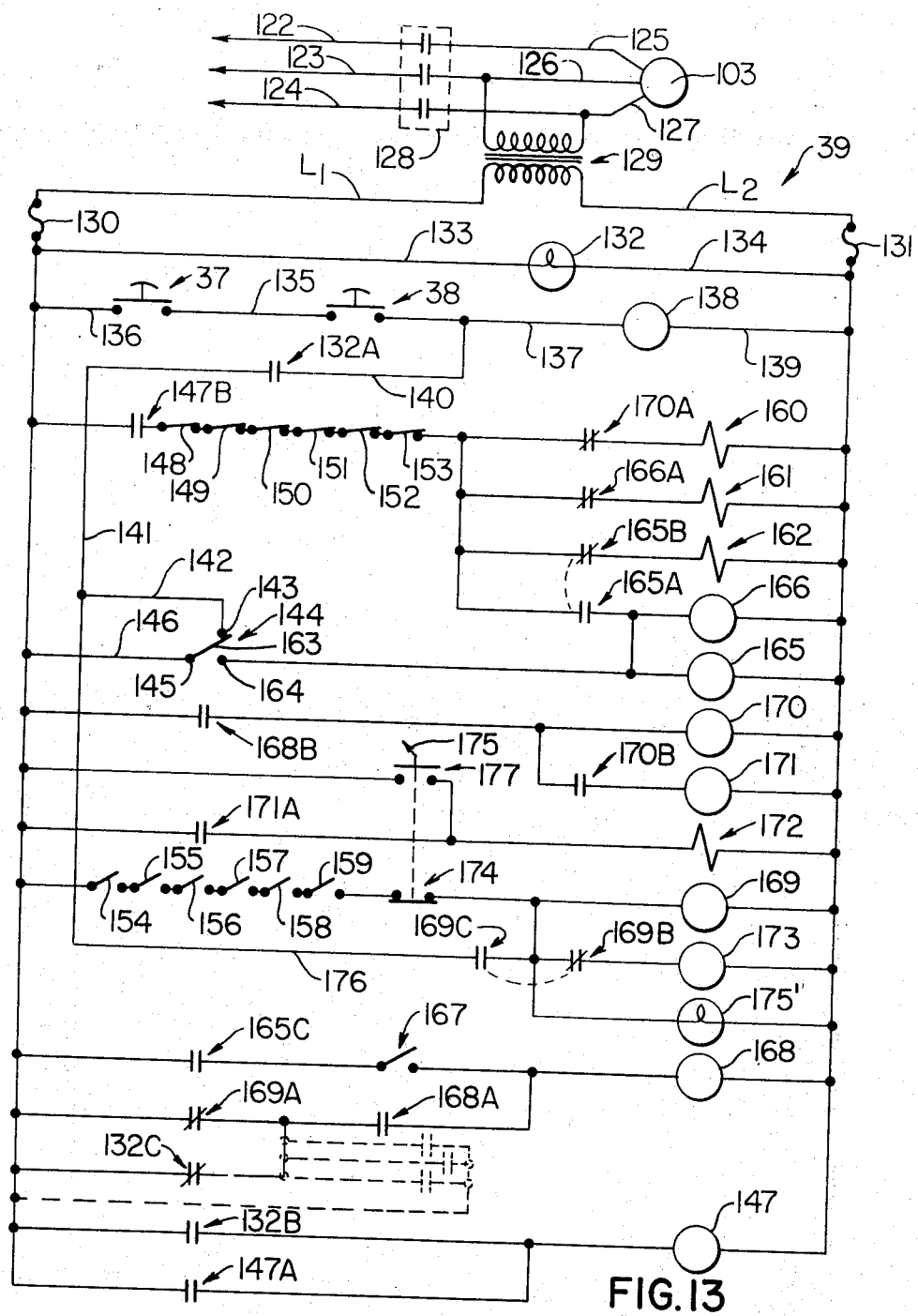
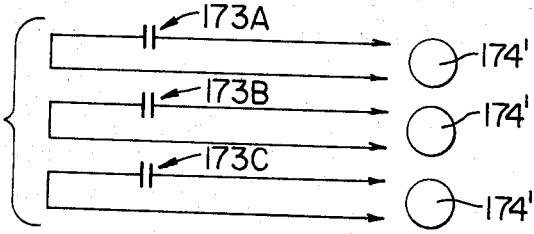
FIG. 13
FIG. 14

METHOD FOR WELDING BELLOWS CONSTRUCTIONS AND THE LIKE

This is a division of application Ser. No. 17,172, filed Mar. 6, 1970, now U.S. Pat. No. 3,666,161.

This invention relates to an apparatus and method for welding together the internal diameters of two bellows members or the like as well as to improved parts of such apparatus and method.

It is well known that in the manufacturing of bellows constructions, subassemblies are formed from two bellows plates or discs having the internal diameters thereof positioned together and being welded around the same so that such subassembly can be subsequently welded to another such subassembly at the outer diameters of the two adjacent bellows members so as to produce a bellows stack that can subsequently have the opposed ends thereof closed.

However, no automatic equipment or method has been provided for welding together the internal diameters of each subassembly of the two bellows members as such operation was basically a hand operation.

According to the teachings of this invention, however, an automatic method and apparatus is provided for welding together the internal diameter of such bellows members or the like.

Another feature of this invention is to provide improved means for holding the internal diameters of the bellows members together for effecting an accurate weld therebetween.

Another feature of this invention is to provide an indexible arrangement for moving a desired part from a loading station thereof to an operating station thereof in a simple and economical manner.

In particular, one embodiment of this invention provides an apparatus that has a frame means carrying a rotatable or indexible member having a plurality of fixtures thereon, each fixture being adapted to receive and hold two bellows members with the internal diameters thereof in a position for being welded together when such fixture is at a loading station. When the fixtures at the loading station have been loaded with the bellows members, the operator causes an indexing means to index or rotate the indexible member to cause the loaded fixtures thereon to move from the loading station thereof to a welding station thereof adjacent corresponding welding means carried by the frame means while the fixtures that were adjacent such welding means now move into the loading station area. When the loaded fixtures reach the welding station, automatic means causes the welding together of the internal diameters of the bellows members while such members are disposed at the welding station.

Accordingly, it is an object of this invention to to provide an improved method for welding together the internal diameters of two bellows members or the like.

Another object of this invention is to provide an improved apparatus of welding together the internal diameters of two bellows members or the like.

Another object of this invention is to provide an improved part of such an apparatus or the like.

Another object of this invention is to provide an improved method and apparatus for indexing a movable member of an apparatus or the like to move a fixture thereon from a loading station to an operating station or the like.

Other objects, uses and advantages of this invention are apparent from a reading of this description which proceeds with reference to the accompanying drawings forming a part thereof and wherein:

FIG. 13 is a wiring diagram to illustrate the operation of the apparatus of this invention.

FIG. 14 is a wiring diagram of the welding apparatus for operating the welding torches of the apparatus of this invention.

Figure 1:
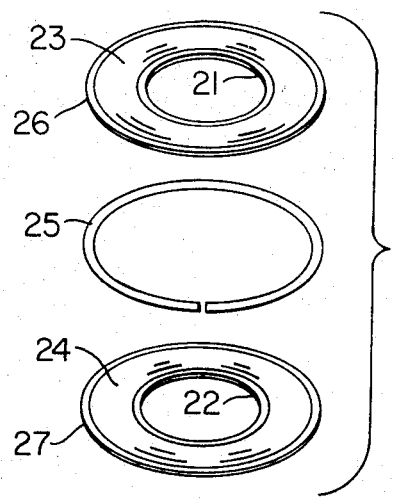
FIG. 1 is an exploded perspective view of the two bellows members and chill ring utilized to form the subassembly that is being made by the method and apparatus of this invention.

While the various features of this invention are hereinafter described and illustrated as being particularly adapted to weld the internal diameters of two bellows members together, it is to be understood that the various features of this invention can be utilized singly or in any combination thereof to provide methods, apparatus, and parts for operating on other items as desired.

Therefore, this invention is not to be limited to only the embodiment illustrated in the drawings, because the drawings are merely utilized to illustrate one of the wide variety of uses of this invention.

Figure 2:
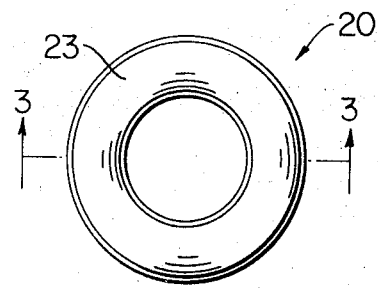
FIG. 2 is a top view of the subassembly of the parts of FIG. 1.
Figure 3:
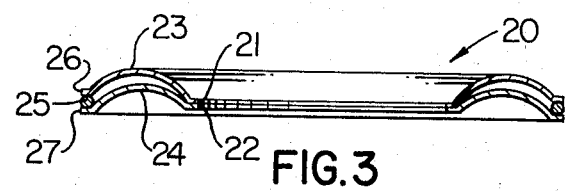
FIG. 3 is an enlarged cross-sectional view taken on line 3—3 of FIG. 2.

Referring now to FIGS. 1, 2 and 3, the method and apparatus of this invention is adapted to provide the bellows subassembly generally indicated by the reference numeral 20 in FIGS. 2 and 3 by automatically welding together the adjacent internal diameters 21 and 22 of two bellows members 23 and 24. The bellows members 23 and 24 are annular discs respectively having transverse cross-sectional bowing slightly different from each other whereby to insure that the substantially straight and flat internal diameters 21 and 22 thereof are properly positioned to be welded together about the entire internal diameter area thereof in a manner hereinafter set forth, a conventional and subsequently removable chill ring 25 has been disposed between the bellows members 23 and 24 at the outer diameters 26 and 27 thereof as illustrated in FIG. 3.

Figure 4:
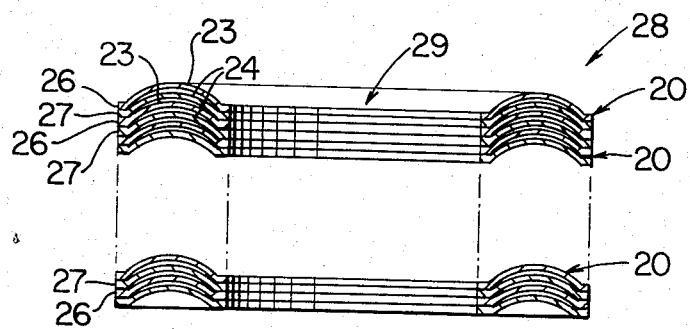
FIG. 4 is a view similar to FIG. 3 and illustrates the subassemblies of FIG. 3 being secured together at the outer diameters thereof to provide a tubular bellows stack or construction.

The subassemblies 20 are subsequently utilized to produce tubular bellows stacks or constructions 28 illustrated in FIG. 4 wherein each subassembly 20 is adapted to be welded to an adjacent subassembly 20 at adjacent outer diameters 26, 27 of adjacent bellows members 23 and 24 of the adjacent subassemblies 20 whereby it can be seen that the tubular bellows construction 28 is substantially a corrugated arrangement having an interior chamber 29 therein which can be completely closed at the tops and bottoms thereof by conventional closing members in a manner well known in the art so as to be interconnected to a desired fluid source, such as by a capillary tube.

As previously stated, the known methods and apparatus for forming the bellows subassembles 20 have been substantially hand operations wherein the operator assembles together the parts 23, 24 and 25 of FIG. 1 into a hand fixture, then takes such loaded hand fixture to a lathe-like apparatus and positions the fixture therein wherein the fixture is rotated relative to a welding torch that is positioned adjacent the internal diameters thereof for welding together such internal diameters. After the internal diameters have been welded together, the operator removes the fixture from the lathe-like apparatus and unloads the same so that a new set of parts can be loaded therein to be welded together in the manner previously described.

However, according to the teachings of this invention, the subassemblies 20 are now formed in an automatic manner by the method and apparatus of this invention generally indicated by the reference numeral 30 in FIGS. 5, 6, 7 and 8 in a manner hereinafter described.

Figure 5:
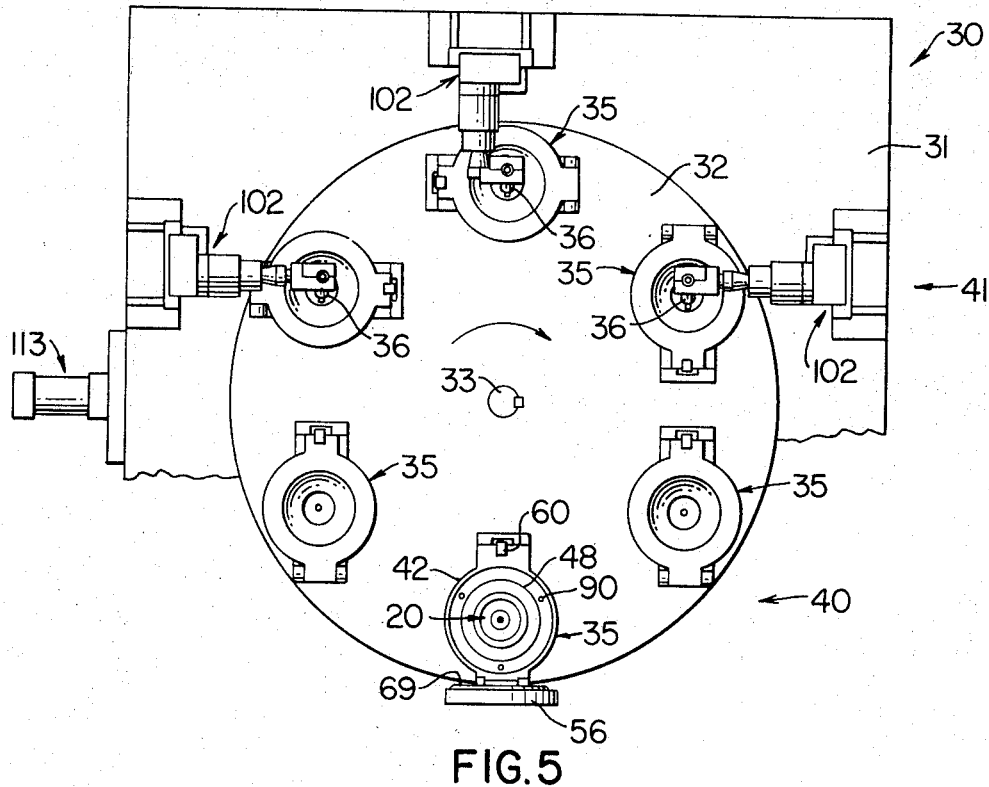
FIG. 5 is a fragmentary front view of the improved apparatus of this invention for welding together the internal diameters of the two bellows members of FIG. 1 to form the subassembly of FIG. 3.
Figure 7:
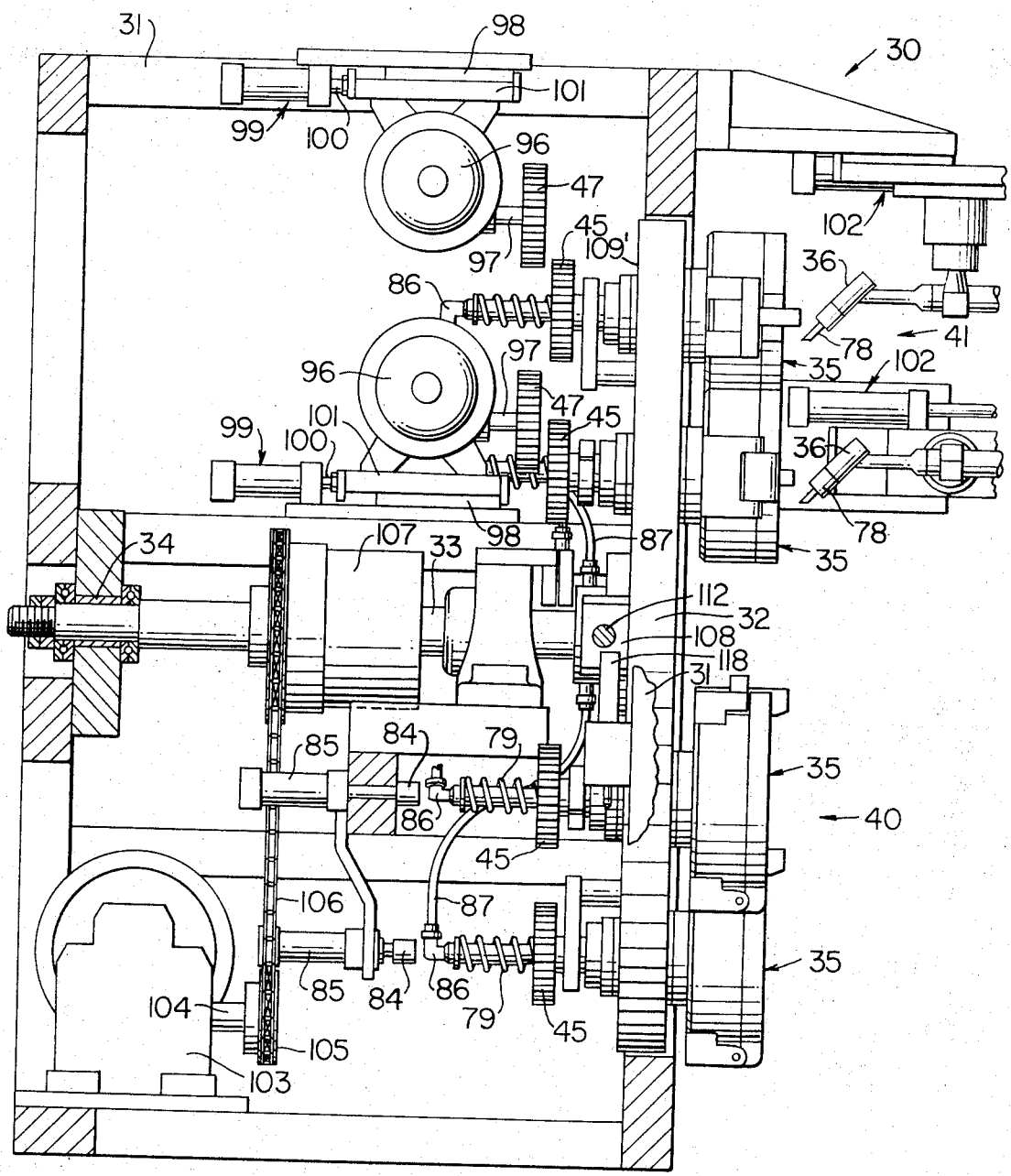
FIG. 7 is an enlarged cross-sectional view of the apparatus and is taken on line 7—7 of FIG. 6.
Figure 8:
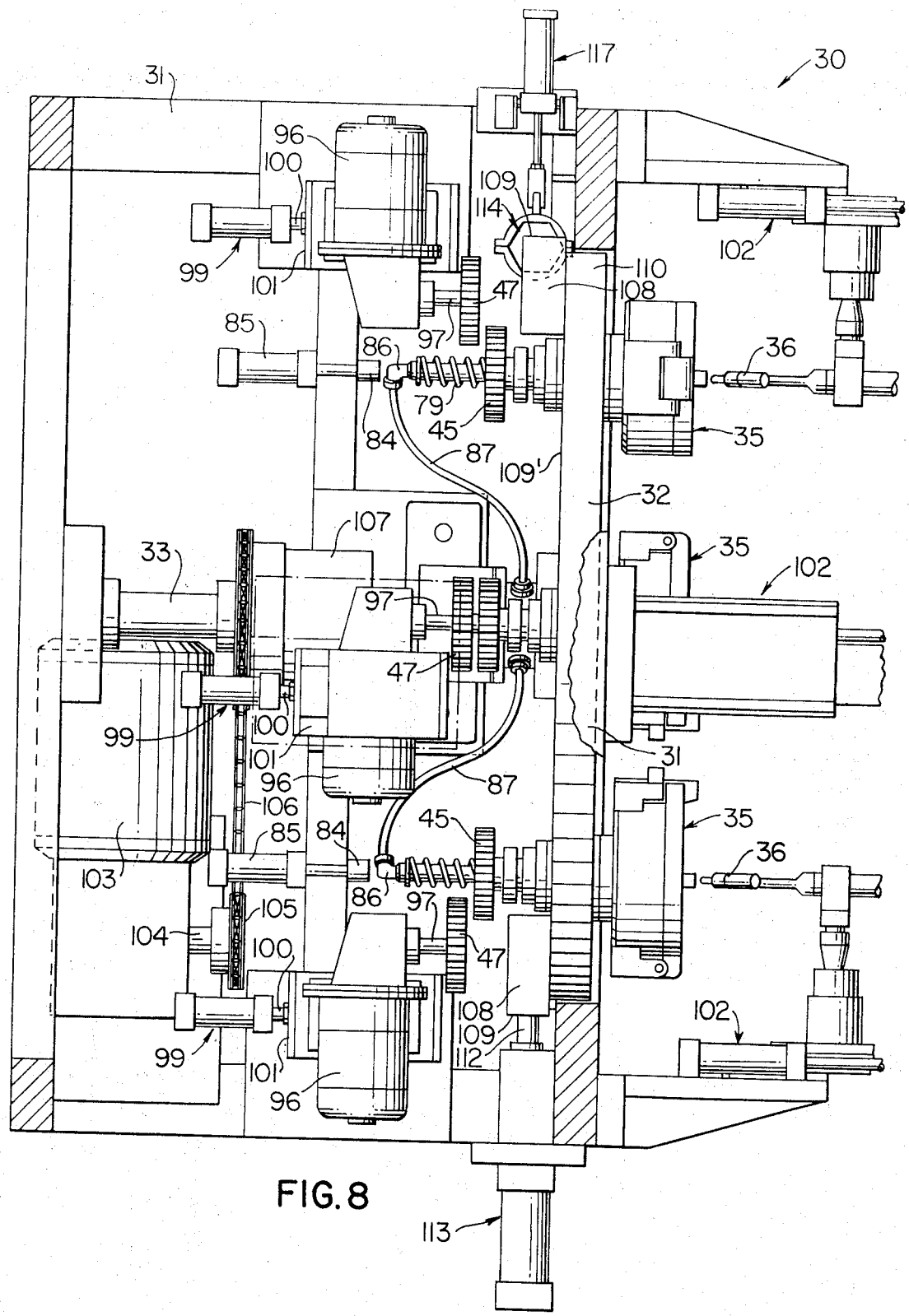
FIG. 8 is an enlarged cross-sectional view of the apparatus and is taken on line 8—8 of FIG. 6.

The apparatus 30 of this invention comprises a frame means 31 rotatably carrying an indexible member or rotatable table 32 having a horizontally disposed shaft means 33 rotatably supported in the frame means 31 by suitable bearing means, such as bearing means 34 in FIG. 7, whereby the table 32 is vertically disposed and has a plurality of rotatable fixtures 35 thereon. The frame means 31 is so constructed and arranged that an operator can be seated in front of the apparatus 30 and the three lower fixtures 35 of the table 32 will be in such a proximity relative to the seated operator that the operator can load and unload the three lower fixtures 35 with the parts of FIG. 1 in a manner hereinafter described at the same time that the three upper fixtures 35 of FIG. 5 are having the internal diameters of the subassemblies 20 therein welded together by three welding torches 36 carried by the frame means 31 in a manner hereinafter described.

After the operator has unloaded the three lower fixtures 35 of FIG. 5 and has inserted the parts of FIG. 1 into each lower fixtures 35, in a manner hereinafter described, the operator then must close two manually operated electrical switches 37 and 38 schematically illustrated in the wiring diagram 39 of FIG. 13 to cause the table 32 to index 180° whereby the lower loaded fixtures 35 will be indexed adjacent the welding torches 36 and the former upper fixtures 35 will now be in a lower position. The three lower fixtures 35 of the indexible member 32 in FIG. 5 are disposed at a loading station 40 of the apparatus 30 whereas the upper three fixtures 35 are disposed at a welding station 41 of the apparatus 30.

It is to be understood that while the apparatus 30 of this invention is hereinafter described and illustrated as being provided with three fixtures 35 to be loaded and unloaded at the welding station 40 and with three other fixtures 35 to be operated on at the welding station 41, the number of fixtures 35 can be varied as desired as will be apparent hereinafter.

Figure 9:
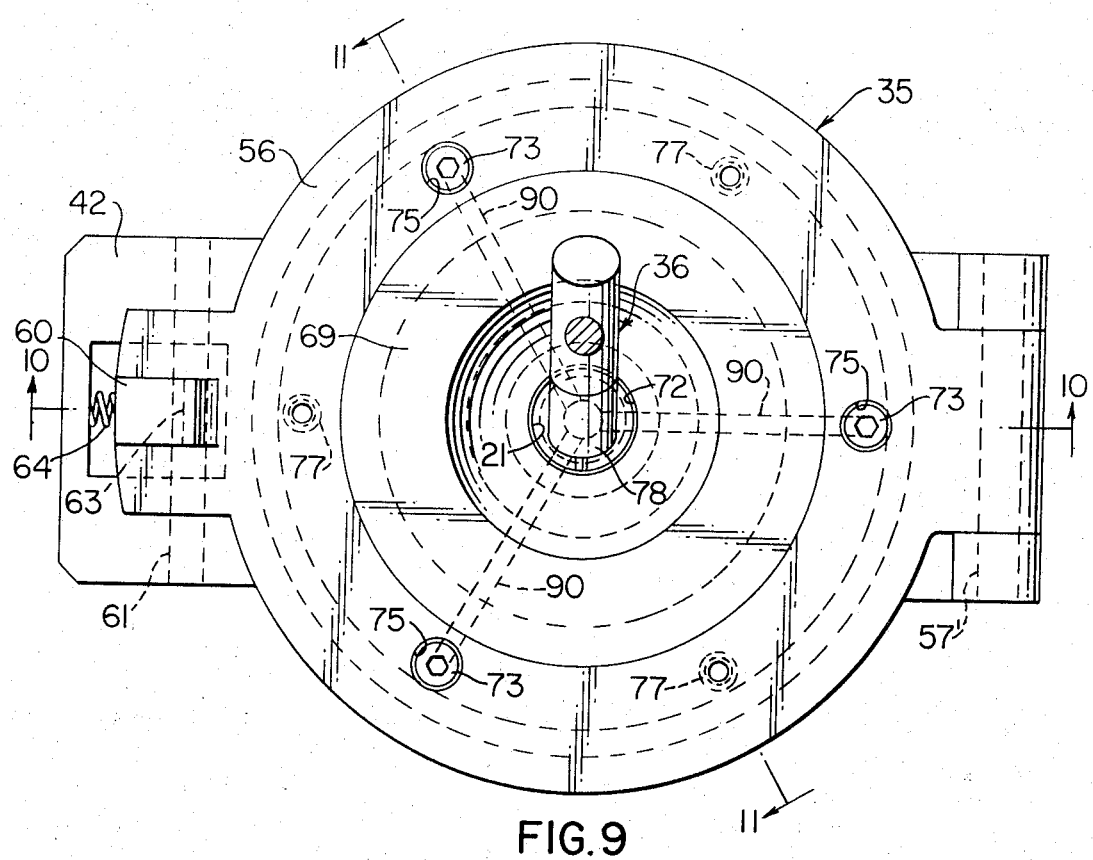
FIG. 9 is a front view of one of the fixtures of the apparatus of FIG. 5 and illustrates the position of the welding torch when received therein for a welding operation.
Figure 10:
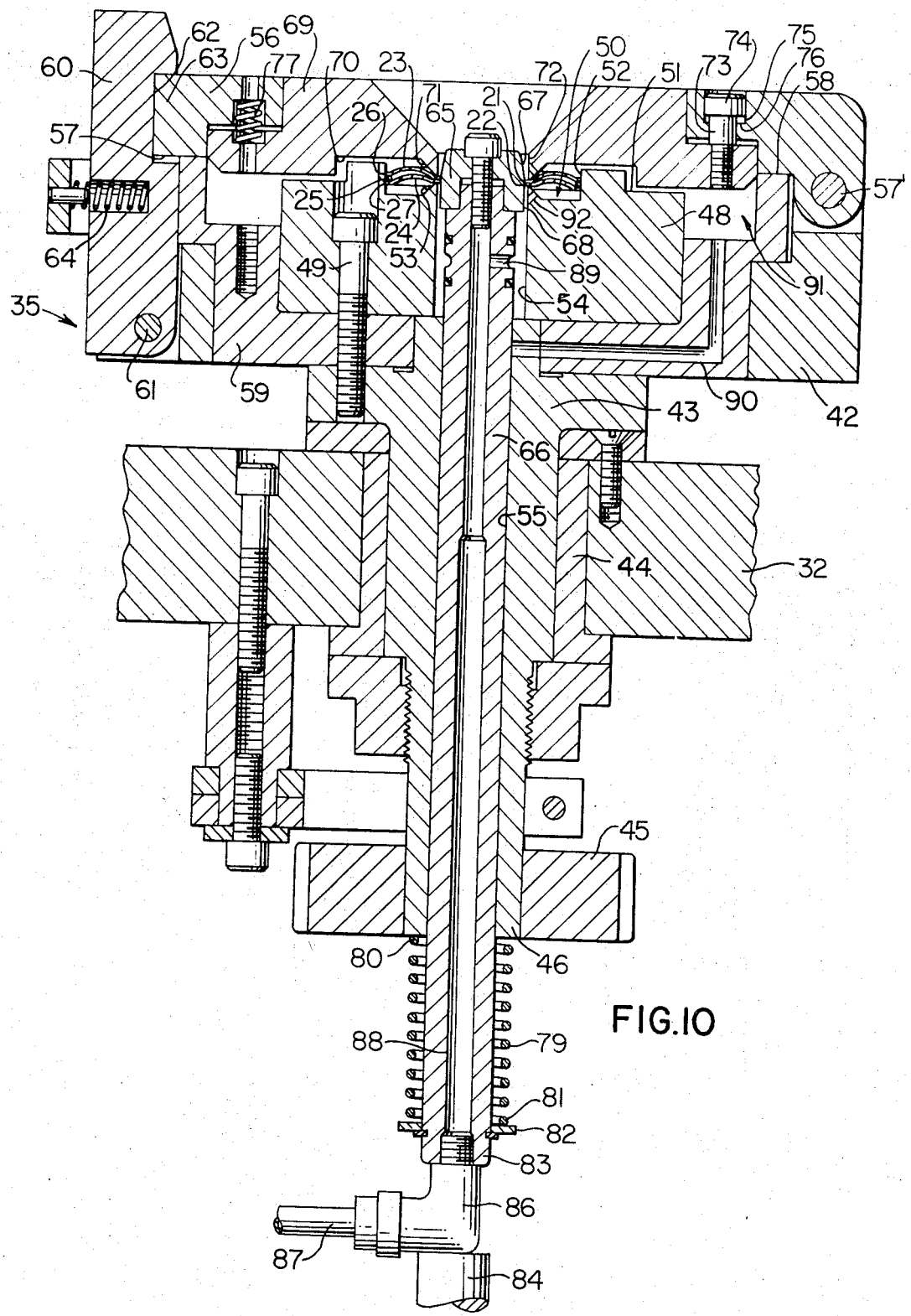
FIG. 10 is a cross-sectional view of FIG. 9 and is taken on line 10—10 thereof.

Since each fixture 35 is constructed in the same manner as the other fixtures 35, only one of the fixtures 35 will be described in detail and reference is now made to FIGS. 9, 10 and 11 wherein the fixture 35 shown therein has a first clamping part or member 42 provided with a hollow shaft-like part 43 rotatably mounted in suitable bearing means 44 of the table or indexible member 32 as illustrated in FIG. 10 whereby the fixture 35 is rotatably mounted to the indexible member 32. The shaft-like part 43 of the fixture 35 carries a pinion gear 45 at the end 46 thereof which is adapted to be driven by a cooperating pinion gear 47 in a manner hereinafter described when the fixture means 35 is disposed at the welding station 41 of the apparatus 30 and a welding operation is taking place whereby the fixture 35 will be rotated by the drive gear 47.

The clamping member 42 has an insert 48 secured thereto by suitable fastening means 49 that, in effect, secure the parts 42, 43 and 48 together, the insert 48 having an annular recess 50 in the outer surface 51 thereof that defines an annular internal cylindrical shoulder or surface 52 and an annular beveled clamping surface 53 adjacent a cylindrical opening means 54 passing completely through the insert 48 and being coaxially aligned with a cylindrical opening 55 passing completely through the part 43 of the first clamping member 42.

A second clamping member 56 is pivotally carried by the clamping member 42 through a hinge pin arrangement 57' and is adapted to be disposed in its clamping position as illustrated in FIG. 10 wherein a surface 57 thereof is disposed in abutting relation with a surface 58 of another part 59 of the first clamping member 42 as illustrated in FIG. 10. A latch member 60 is pivotally mounted to the clamping member 42 by a pivot pin 61 and has a notch means 62 for receiving an end part 63 of the movable clamping member 56 therein to lock the same in its clamping position as illustrated in FIG. 10, the latching member 60 being urged to its latching position by a compression spring 64. However, the operator can readily pivot the latching member 60 to the left in FIG. 10 in opposition to the force of the compression spring 64 to free the clamping member 56 therefrom so that the clamping member 56 can be swung to an open position as illustrated by the lower most fixture 35 in FIG. 5 so that the operator can assembly the parts 23, 24 and 25 into the recess 50 of the part 48 of the clamping member 42 as illustrated in FIG. 10 wherein the annular clamping surface 53 of the clamping member 42 abuts against the bellows member 24 just inboard of and adjacent to the internal diameter 22 thereof while the external diameters 27 and 26 of the bellows members 24 and 23 are being guided and supported by the annular shoulder 52 of the part 48. Also, the internal diameters 21 and 22 of the bellows members 23 and 24 when being inserted in the recess 50 of the clamping member 42 are being telescoped onto centering portion 65 of a plunger 66 disposed in the opening means 54 and 55 of the parts 48 and 43 of the clamping member 42 and being reciprocal therein in a manner hereinafter described. The centering portion 65 of the plunger 66 has a frustoconical section 67 for guiding the bellows members 23 and 24 thereon so that the same will be subsequently positioned on a cylindrical portion 68 thereof as illustrated in FIG. 10 during the loading thereof into the fixture 35.

The movable clamping member 56 carries a movable insert 69 having its surface 70 so constructed and arranged that the same cooperates with the surface 51 of the part 48 of the clamping member 42 and defines a beveled annular clamping surface 71 adjacent an opening means 72 passing therethrough with the clamping surface 71 being adapted to engage and clamp against the bellows member 23 adjacent to and just inboard of the internal diameter 21 thereof.

The annular clamping surfaces 71 and 53 of the inserts 69 and 48 of the clamping members 56 and 42 are superimposed upon each other when the clamping member 56 is disposed in the clamping position as illustrated in FIG. 10.

The insert 69 of the clamping member 56 is interconnected to the clamping member 56 by lost motion members 73 each being secured to the insert 69 and having an enlarged head 74 disposed in slot 75 of the clamping member 56 and being engagable against shoulder means 76 thereof. A plurality of compression springs 77 are disposed between the clamping member 56 and the insert 69 to tend to take up the lost motion therebetween and position the insert 69 away from the clamping member 56 wherein the enlarged head 74 of the fastening member 73 are disposed against the shoulders 76. However, when the clamping member 56 is moved to its clamping position as illustrated in FIG. 10, the insert 69 is moved toward the clamping member 56 in opposition to the force of the compression springs 77 upon its engagement with the bellows member 23 whereby the compression springs 77 maintain the bellows members 23 and 24 under a clamping force between the knife-like annular clamping surfaces 53 and 71 of the clamping members 56 and 42 when the same are disposed in the clamping position as illustrated in FIG. 10. Thus, the plunger 66 can have its centering position 65 subsequently untelescoped and moved away from the bellows members 23 and 24 in the manner illustrated in FIG. 11 so that the welding tip 78 of a welding torch 36 can be received in the opening means 72 and 54 of the inserts 69 and 48 to perform a welding operation on the adjacent internal diameters 21 and 22 of the bellows members 23 and 24 completely around the same in a manner hereinafter described.

Figure 11:
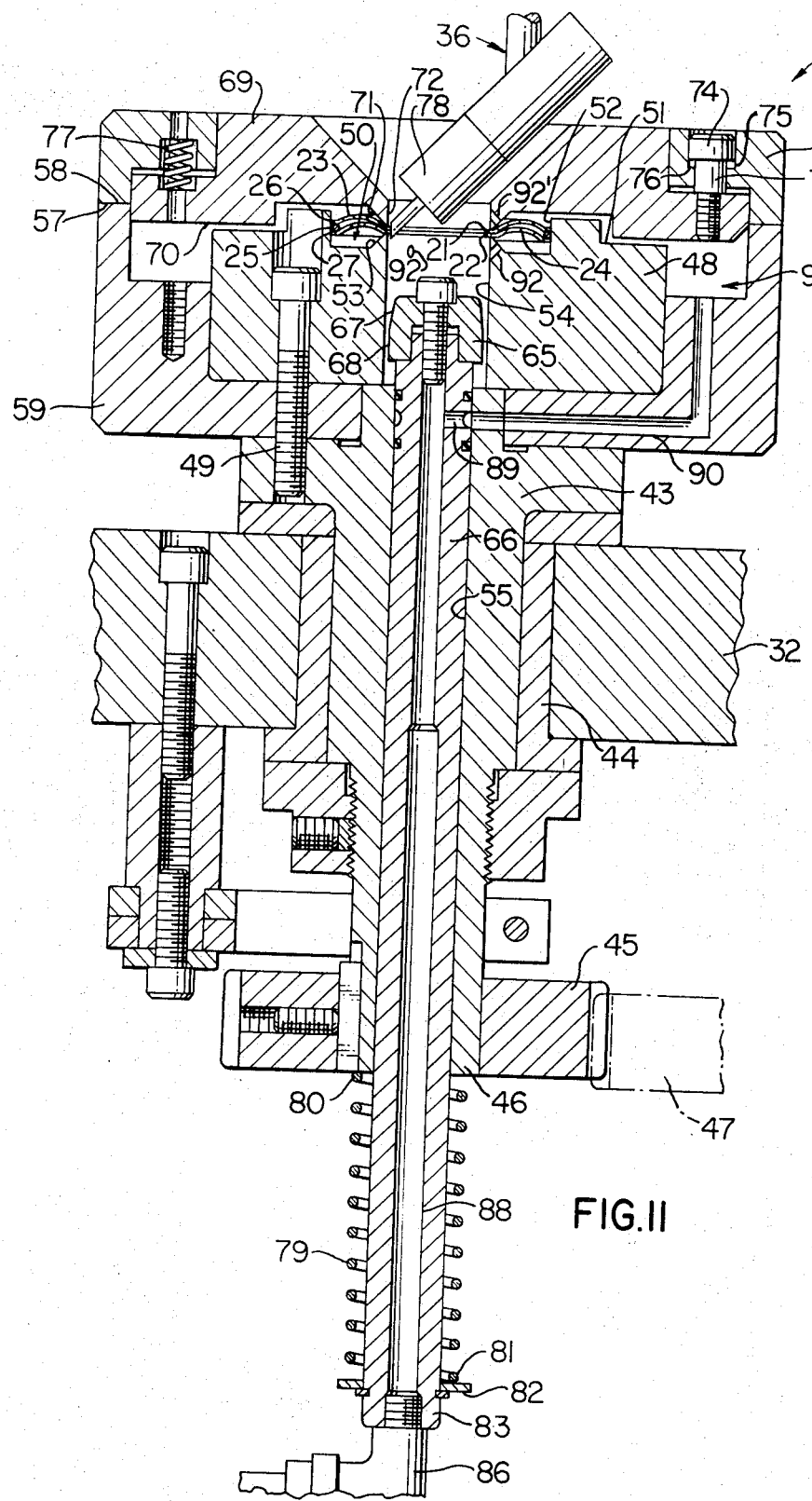
FIG. 11 is a cross-sectional view of the fixture of FIG. 9 and is taken on line 11—11 thereof.

The plunger 66 for each fixture 35 is normally moved to the position illustrated in FIG. 11 away from the clamping surfaces 53 and 71 thereof by a compression spring 79 having one end 80 thereof bearing against the end 46 of the part 43 of the clamping member 42 and the other end 81 thereof bearing against a retainer ring 82 carried at the end 83 of the plunger 66. However, when a fixture 35 is disposed at the loading and unloading station 40 of the apparatus 30, a piston rod 84 of a piston and cylinder device 85 carried by the frame means 31 is adapted to be extended toward the plunger 66 to engage against a fitting 88 thereof at the end 83 of the plunger 66 and move the same into its loading and unloading position illustrated in FIG. 10 in opposition to the force of the compression spring 79.

The fitting 86 for each plunger 66 is adapted to fluidly interconnect a flexible conduit 87 to a passage means 88 formed in the plunger 66 and leading to a transverse bore 89 thereof that is adapted to be alignable with a passage means 90 in the part 59 in the clamping member 42 when the plunger 66 is disposed in its normally withdrawn position as illustrated in FIG. 11 whereby backup gas can be supplied through the conduit 87, fitting 86, plunger passage 88 and 89, and clamping member passage 90 to the space 91 between the clamping members 42 and 56 and subsequently into the recess 72 of the insert 48 and through a plurality of openings 92 formed through the clamping surface 53 of of the insert 48 to the opening means 54 of the insert 48 to provide backup gas for the welding operation, if needed.

Therefore, it can be seen that each fixture 35 is adapted to be readily loaded with the parts for forming the subassembly 20 in a simple and effective manner wherein the internal diameters 21 and 22 of the bellows members 23 and 24 are clamped together closely adjacent the internal diameters 21 and 22 by the cooperating clamping surfaces 53 and 71 of the clamping members 42 and 56 and that the same are positively positioned therein by the positioning plunger 66 during the loading operation whereby the welding tip 78 of the welding torch 36 can accurately weld the internal diameters 21 and 22 together in a manner hereinafter described.

Once the subassembly 20 has been welded, and the particular fixture 35 carrying the same has been indexed to the loading and unloading station 40, the operation can open the clamping member 56 of the fixture 35 and since the plunger 66 has been extended into the openings 54 and 72 of the clamping members 42 and 56 by the piston rod 84, the plunger 66 facilitates the removal of the welded subassembly 20 from the fixture 35.

Figure 12:
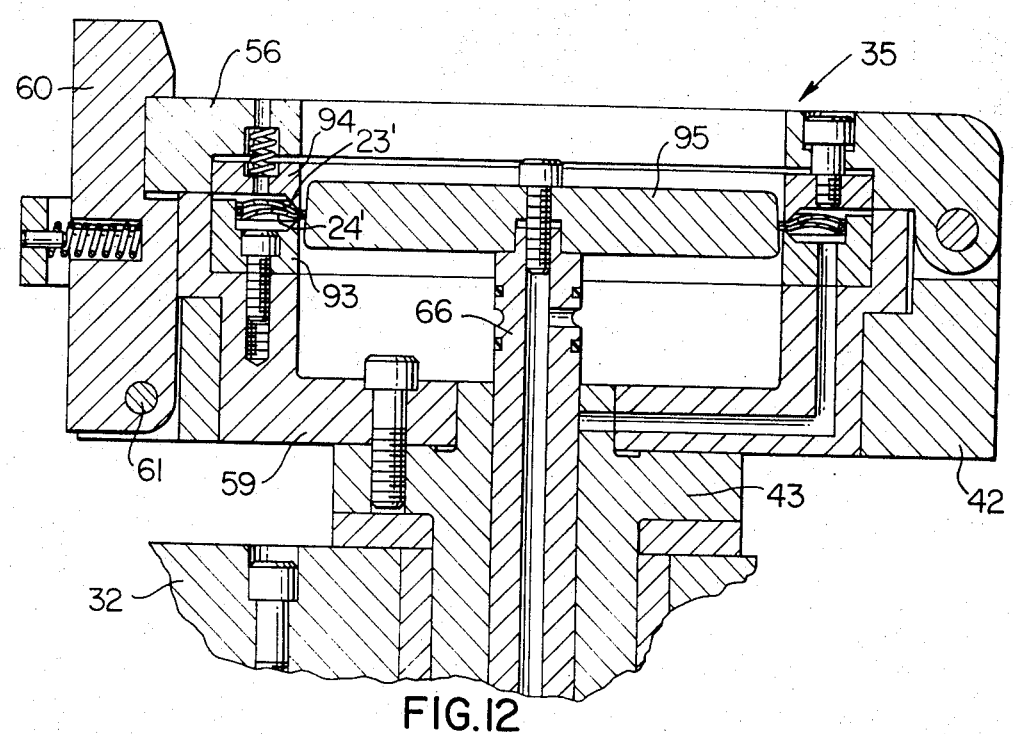
FIG. 12 is a fragmentary view similar to FIG. 10 and illustrates the fixture with new inserts therein to accommodate bellows members of a different size.

If it is desired to utilize the apparatus 30 for welding bellows members of larger or smaller size than the bellow members 23 and 24, the inserts 48 and 69 of each fixture 35 can be easily changed to inserts of a different size, such as inserts 93 and 94 of FIG. 12, and the centering portion 65 of the plunger 66 can be easily changed to a cooperating size, such as plunger portion 95 of FIG. 12. In this manner the fixtures 35 can be converted to produce the clamping and welding operation on bellows members 23' and 24' of a size different from the size of the bellows members 23 and 24 previously described. Therefore, it can be seen that the method and apparatus of this invention is not limited to a particular sized bellows subassembly 20.

The frame means 31 carries three drive motors 96 having their effective output shafts 97 respectively carrying the pinion gears 47 previously described which are to be utilized to drive the pinion gears 45 of the three fixtures 35 at the welding station 41. In particular, each motor 96 is mounted for sliding movement on a part 98 of the frame means 31 by a piston and cylinder arrangement 99 also carried by the frame means 31. Thus, when the piston and cylinder arrangements 99 are actuated to extend their piston rods 100 to the right in FIGS. 7 and 8, the motor mount 101 of each motor 96 is axially moved to the right so that the pinion gear 47 thereof is axially moved into meshing engagement with a gear 45 of a fixture 35 whereby the three fixtures 35 at the welding station 41 will be rotated relative to the indexible member or ratatable table 32 during a welding operation in a manner hereinafter described.

Similarly, the welding torches 36 are mounted for sliding movement on the frame means 31 of the apparatus 30 and are respectively moved back and forth relative to the rotatable table 32 by piston and cylinder units 102 in a manner similar to the piston units 99 for the motors 96.

A main drive motor 103 is carried by the frame means 31 and has its output shaft 104 driving a sprocket gear 105 which has a chain 106 looped about the same and also looped around a pneumatically operated drive clutch 107 mounted on the shaft means 33 of the rotatable table 32 so that when the motor 103 is operating to drive the chain 106, operation of the clutch 107 will couple the drive motor 103 to the shaft 33 to rotate the table 32 in a manner hereinafter described.

The rotatable table 32 carries two blocks 108 on the rear side 109' thereof with the blocks 108 respectively having ends 109 extending beyond the outer periphery 110 of the rotatable table 32. The end 109 of each block 108 has a substantially frusto-conical opening 111 interrupting the same and adapted to receive a mating, frustoconical centering pin 112 in the manner illustrated in FIGS. 6 and 8 to properly center the rotatable table 32 relative to the frame means 31, the centering pin 112 being adapted to move inwardly and outwardly relative to an associated block 108 by a piston and cylinder arrangement 113.

A piston and cylinder shock absorber 114 is pivotally mounted to the frame means 31 by a pivot pin 115 (FIG. 6) and is adapted to have its cushioning piston rod 116 pivoted into the path of movement of either one of the blocks 108 of the rotatable table 32 by a piston and cylinder arrangement 117 in a manner hereinafter described.

Figure 6:
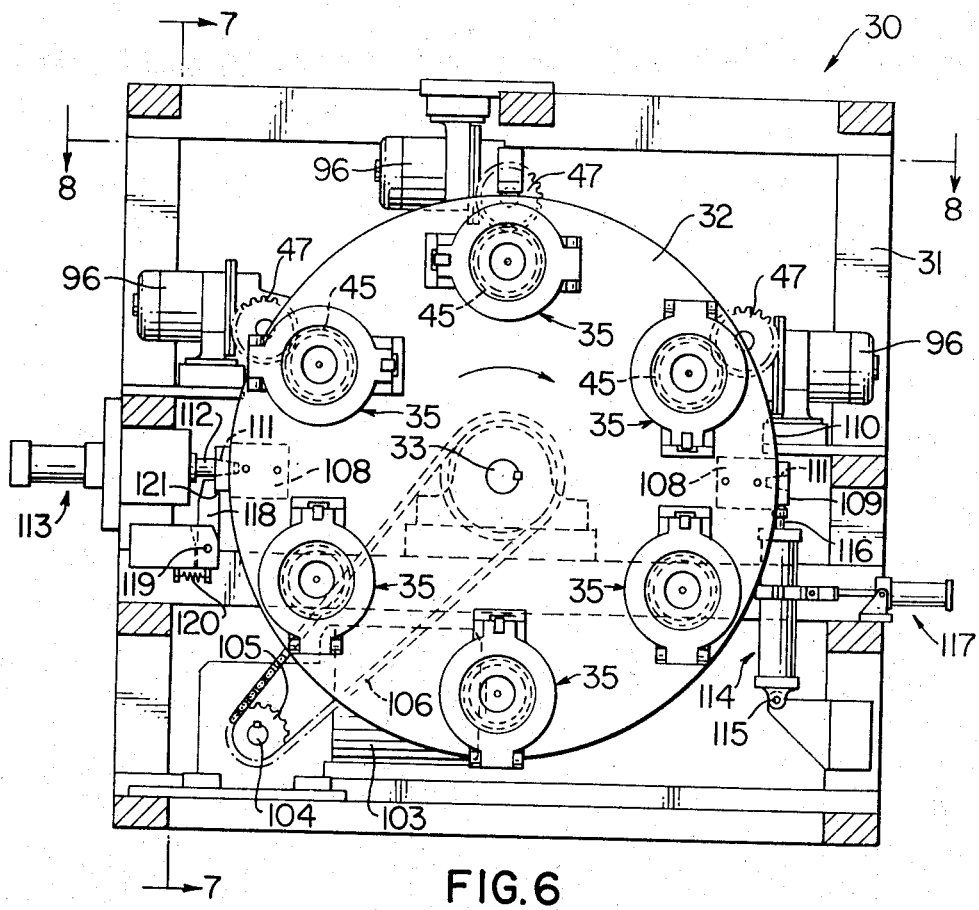
FIG. 6 is a view similar to FIG. 5 with parts of the apparatus being taken in cross section to illustrate the structure behind the same.

An abutment member 118, FIG. 6, is pivotally mounted to the frame means by a pivot pin 119 and is normally pivoted to the position illustrated in FIG. 6 by a tension spring 120, the abutment member 118 having a notch 121 for receiving the projecting part 109 of either block 108 therein.

When the table 32 is to be indexed 180° from the position illustrated in FIG. 6, the clutch 107 is operated to cause the table 32 to begin to rotate about 90° in a clockwise direction before the clutch means 107 declutches from the shaft 33 thereof so that the inertia of movement of the table 32 continues to rotate the same. However, before the table begins to rotate, the centering pin 112 is withdrawn from its block 108 and the shock absorber 114 is pivoted out of the path of movement of the right-hand block 108 in FIG. 6 so that after the right-hand block 108 moves beyond the shock absorber 114, the shock absorber 114 can be again pivoted back to the position illustrated in FIG. 6 so that subsequently when the new block 108 comes around the same will engage against the piston means 116 of the shock absorber 114 so that the momentum and rotational movement of the table 32 will be terminated by the shock absorber 114.

In fact, after a block 108 has hit against the shock absorber 114 to terminate the clock-wise movement of the table 32, the table 32 would tend to move backwardly in a counterclock-wise direction except that the other block 108 is restrained from moving beyond the notch 121 of the latch member 118 because the block now on the left-hand side of the table 32 in FIG. 6 had cammed past the lever 118 in opposition to the force of the tension spring 120 a distance sufficient to permit the same to be retained by the notch 121 of the latch member 118 when the now right-hand block 108 contacts the shock absorber 114. Thus, the upward force of the shock absorber 114 maintains the left-hand block 108 of FIG. 6 into the notch 121 of the latch member 118 so that the centering pin 112 can now be received in the opening 111 of the left-hand block 108 and positively center the table 32 relative to the frame means 31 for a subsequent welding operation on the upper three fixtures 35 thereof in the manner previously described.

It has been found that the centering pin arrangement 112 and shock absorber arrangement 114 permits the table 32 to be indexed each time 180° and to place the fixtures 35 within the desired position relative to the torches 36 within a respectable and repeatable accuracy of plus or minus 0.002 of an inch.

The general operation of an apparatus 30 of this invention will now be described with the more specific details of the operation being later described in connection with the electrical diagram 39 of FIG. 13.

With the table 32 disposed in the position illustrated in FIG. 5, the operator loads the three lower fixtures 35 at the loading station 40 with the bellows parts 23, 24 and chill ring 25 in the manner previously described. He then closes the manual switches 37 and 38 (FIG. 13) whereby with the torches 36 in their out position, with the plungers 66 in their out positions and with the motors 96 in their out position relative to the fixtures 35 as illustrated in FIG. 7, the centering pin 112 is removed from its block 108 and the shock absorber 114 is removed from its block 108 so that the clutch 107 can clutch the drive motor 103 to begin to rotate the table 32 in a clock-wise in FIG. 5. As previously described, the drive motor 103 is declutched from the drive shaft 33 so that the table 32 and its blocks 108 in cooperation with the shock absorber 114 and centering pin 112 again accurately position the table 32 in its new position so that the previously loaded three fixtures 35 are now at the welding station 41 as illustrated in FIG. 5. At this time, the motors 96 and torches 36 are automatically moved inwardly whereby the motor gears 47 mesh with the gears 45 to begin to rotate the fixtures 35 and the welding tips 78 of the torches 36 are received in the openings 72 and 54 of the clamping members 42 and 56 of the fixtures 35 to weld the inner diameters 21 and 22 of the bellows members 23 and 24 together as the bellows members 23 and 24 are rotated relative to the torches 36 through an arc greater than 360° to insure the complete weld around the entire inner periphery of the subassembly 20. When the welding operation is completed, the torches 36 and motors 96 automatically move outwardly and remain in such out position until the table 32 is again indexed by the operator. However, during the time that the welding operation is taking place on the upper three fixtures, the operator has unloaded the lower three fixtures 35 at the station 40 and reloaded the same with new parts 23, 24, and 25 so that when the welding operation on the upper three fixtures 41 has terminated, the operator can again cause the table 32 to index 180° in the manner previously described. However, if the welding operation taking place at the station 41 has not been completed at the time the operator desires to index the table 32, he cannot cause the table to index until the welding operation at the station 41 has been completely terminated.

Therefore, it can be seen that this invention provides an automatic method and apparatus for providing the bellows subassemblies 20 in an efficient and economical manner.

Referring now to FIG. 13, a three phase 440 volt electrical power source is indicated by three wires 122, 123, and 124 which are adapted to be interconnected to the cooperating three wires 125, 126, and 127 for the main motor 103 when a master starter switch 128 is closed whereby the main drive motor 103 is continuously operated and a transformer means 129 tapped to the wires 126 and 127 is now continuously operated to provide a 115 voltage power source at main leads $L_1$ and $L_2$ which supply a control panel of the apparatus 30 as illustrated by the diagram 39 in FIG. 13 as well as 115 volt current to the motors 96 so that the motors 96 are also continuously operating once the master switch 128 is moved to its closed position.

With the power source leads $L_1$ and $L_2$ now providing a power source through suitable fuses 130 and 131, a control panel indicating light 132 is energized as the same is placed across the power source leads $L_1$ and $L_2$ by leads 133 and 134. The indexing buttons 37 and 38 are respectively disposed in series by a lead 135 that is adapted to be interconnected by a lead 136 to the power source lead $L_1$ when the switch 36 is closed and interconnected to a lead 137 when the switch 38 is closed, the lead 137 being interconnected to one side of a relay 138 having the other side thereof interconnected to the power source lead $L_2$ by a lead 139.

Assuming that the operator desires to now index the table 32, the operator closes the switches 37 and 38 which energizes the relay 138 which becomes self-holding because the same closes its contact 132A whereby a lead 140 is interconnected by the closed contacts 132A to a lead 141 that is interconnected by a lead 142 to a contact 143 of a normally closed limit switch 144 that has its other contact 145 interconnected to the power source lead $L_1$ by a lead 146. The energized relay 138 also closes its contacts 132B to place a relay 147 across the power source leads $L_1$ and $L_2$, the relay 147 now becoming also self-holding as the same closes its normally opened contact 147A. The purpose of relay 147 is to keep the table 32 from indexing when the power is first turned on, as will be apparent hereinafter.

With all three motors 96 and all three torches 36 being in the "out" position, that is, away from the table 32, limit switches 148, 149, 150, 151, 152 and 153 are in their closed position, whereas the limit switches 154, 155, 156, 157, 158 and 159 are in their open position. Conversely, should the motors 96 and torches 36 be in their "in" position, that is, in their innermost position towards the table 32, the limit switches 154–159 will be closed and the limit switches 148–153 would be opened.

However, with the limit switches 148–153 being disposed in their closed position, as illustrated in FIG. 13, the now energized relay 147 closes its normally opened contacts 147B to place the electrically operated valve means 160 for the lock and centering pin pneumatic cylinder arrangement 113 across the power source leads $L_1$ and $L_2$ whereby fluid is directed to the piston and cylinder arrangement 113 to cause the same to withdraw the lock pin 112 from the opening 111 in the block 108 positioned therewith. Simultaneously, an electrically operated valve means 161 for operating the clutch 107 and an electrically operated valve means 162 for the cylinder arrangement 117 for the shock absorber 114 are energized with the closing of the relay contacts 147B so that the drive motor 103 is clutched to the shaft 33 of the table 32 and the shock absorber 114 is moved out of the path of movement of the block 108 adjacent thereto.

Thus, the table 32 now begins to index in a clockwise direction in FIG. 6 relative to the frame means 31.

During such indexing of the table 32, the table 32 at about the time it has been indexed about 90°, momentarily actuates the limit switch 144 to move the switch blade 163 thereof out of contact with the contact 143 so that the relay 138 is now deenergized and the switch blade 163 is moved into contact with the normally opened contact 164 to place a relay 165 across the power source leads $L_1$ and $L_2$ whereby the relay 165 then becomes self-holding as the same closes it normally opened contacts 165A, the relay 165 being placed across the power source leads $L_1$ and $L_2$ through the closed limit switches 148–153 and closed relay contacts 147B of the relay 147. Normally closed contacts 165B of the relay 165 of the now energized relay 165 open to thereby deenergize the valve means 162 to cause the piston and cylinder arrangement 117 to again place the shock absorber 114 into the path of movement of the block 108 on the moving table 32, as illustrated in full lines in FIG. 6. The momentary closing of the limit switch 114 to energize the relay 165 also causes a timer 166 to be energized as the same is placed across the power source leads $L_1$ and $L_2$ by the now closed relay contacts 165A, closed limit switches 148–153 and closed relay contacts 147B.

As the timer 166 is now running, the same runs out its time to open its normally closed contacts 166A to deenergize the valve means 161 for the clutch 107 whereby the clutch 107 can now disconnect the shaft 33 from the drive motor 103.

The block 108 of the table 32 now engages against the piston rod 116 of the shock absorber 114 so as to complete the index of the table 32 and prevent further rotation thereof in the manner previously described. At this time, the indexed table 32 closes a limit switch 167 which energizes a relay 168 by placing the same across the power source leads $L_1$ and $L_2$ since the relay 165 also has its normally opened contacts 165C in a closed position thereof. Relay 168 now becomes self-holding because it closes its normally opened contacts 168A and normally closed contacts 169A of a timer 169.

The energized relay 168 also closes its normally opened contacts 168B to now place a timer 170 across the power source leads $L_1$ and $L_2$. The operation of the timer 170 now opens normally closed contacts 170A to deenergize the electrically operated valve 160 for the lock pin, piston and cylinder arrangement 113, whereby the piston and cylinder arrangement 113 now causes the centering pin 112 to enter into the opening 111 of the block 108 positioned adjacent thereto to fully center and lock the table 32 relative to the frame means 31 in the manner previously described.

Operation of the timer 170 also causes it to close its normally opened contacts 170B to energize a timer 171 by placing the same across power source leads $L_1$ and $L_2$ to now close contacts 170B and 168B.

Energized timer 171 now closes its normally open contacts 171A, which energizes an electrically operated valve means 172 that operates the piston and cylinder arrangements 99 and 102 for the motors 96 and torches 36 to move the motors 96 and torches 36 inwardly toward the table 32 to respectively place the drive gears 47 into meshing relation with the gears 45 of the fixtures 35 at the welding station 41 and the tips 78 of the torches 36 adjacent the internal diameters of the assemblies 20 of the fixtures 35 disposed at the welding station 41. Energized valve means 172 also operates the piston and cylinder arrangements 85 to extend their rods 84 and thereby extend the plungers 66 of the lower fixtures 35 into their loading and unloading positions as illustrated in FIG. 10.

When the three motors 96 and three torches 36 are now in their innermost position, as previously described, the limit switches 148-153 open and the limit switches 154-159 are closed so that relay 173 is placed across the power source leads $L_1$ and $L_2$ through the normally closed contacts 174 of a selector switch 175 and normally closed contacts 169B of the timer 169. Energized relay 173 now closes its normally opened contacts 173A, 173B and 173C of FIG. 14 to give a signal to the welding equipment 174' for each torch 36 to turn on and produce a welding heliarc for welding the inner diameters 21 and 22 of the bellows members 23 and 24 together as the fixtures 35 rotate relative to the torches 36. A red light 175' is also energized through the closed limit switches 154-159 and the normally closed contacts 174 of the selector switch 175 to indicate that a welding operation is taking place at the upper fixtures 35. The previously described timer 169 is also energized through the now closed limit switches 154-159 and normally closed contacts 174 of the selector switch 175 and when timed out opens the normally closed contacts 169B to deenergize the relay 173 and therefore open the contacts 173A, 173B and 173C to terminate the operation of the torches 36.

When the timer 169 times out, it will open its normally closed contacts 169A. However, no further operation for the apparatus 30 now takes place because normally closed contacts 132C of the relay 132 maintain the relay 168 energized across the power source leads $L_1$ and $L_2$ even though the normally closed timer contacts 169A are now in an open position.

The table 32 now remains in this position until the operator has unloaded and reloaded the lower three fixtures 35 in the manner previously described at the loading station 40 thereof and then again closes the main switches 37 and 38 to initiate a new indexing of the table 32.

When the operator now desires to again index the table 32, the operator pushes in on the switches 37 and 38 which now energizes relay 138 placing the same across power source leads $L_1$ and $L_2$ in the manner previously described. Energized relay 138 not only closes its normally opened contacts 132A to make itself self holding in the manner previously described, but the same now opens its normally closed contacts 132C to deenergize the relay 168 which opens its normally opened contacts 168B so that the timers 170 and 171 can be deenergized. Opening of the contacts 171A deenergizes valve means 172 so as to cause the piston and cylinder arrangements 99 and 102 for the motors 96 and torches 36 to move the same outwardly while causing the cylinders 85 for the plunger 66 of the lower fixtures 35 to move the piston rods 84 to the left in FIG. 8 and thereby retract the centering portions 65 of the plunger 66 from the bellows members 23 and 24 at the lower three fixtures 35.

The outward movement of the motors 96 and torches 36 causes the limit switches 154-159 to open although the timer 169 remains energized through its closed contacts 169C which is interconnected by a lead 176 to the lead 141 at the juncture of the lead 141 with the lead 142.

When the motors 96 and torches 36 have moved completely outwardly away from the table 32, the same close the limit switches 148-153 whereby the closing of the limit switches 148-153 whereby the closing of the limit switches 148-153 initiates a new indexing operation through the operation of the valve means 160-162 in the manner previously described except that momentary operation of the switch 144 as the table 32 is rotated in addition to the deenergizing of relay 132 as previously described also serves to deenergize the timer motor 169 so that it can be reset in the manner previously described.

Should it be desired that when the master switch 128 previously described is initially turned on to check whether the torches 36 will be in proper position within the fixtures 35, the operator can operate the selector switch 175 of FIG. 13 to move the normally opened contact section 176' thereof to a closed position while simultaneously opening the contacts 174 whereby the valve means 172 will be placed across the power source leads $L_1$ and $L_2$ by the now closed contact means 177 of the selector switch 175 to move the motors 96 and welding torches 36 inwardly toward the table 32 for such checking purposes. However, upon the release of the switch 175 back to the full line position illustrated in FIG. 13, the valve means 172 is deenergized so that the torches 36 and motors 96 are caused to move back outwardly in the manner previously described.

Therefore, it can be seen that not only does the structure of the apparatus 30 operate in the manner previously described, but also the electrical circuit 39 for such apparatus renders the same fully automatic to accomplish the welding purposes previously described.

Therefore, not only does this invention provide an improved apparatus and method for automatically welding together the inner diameter of bellows members as previously set forth, but also this invention provides improved parts and method steps of such apparatus and methods.

While the form of the invention now preferred has been described as required by the statutes, other forms may be utilized all coming within the scope of the claims which follow.

What is claimed is:

1. A method for welding together the internal diameters of two bellows members comprising the steps of axially disposing said bellows members with said internal diameters thereof in a position for being welded together in a clamping member of a fixture on an indexible member movably carried by a frame means, moving another clamping member of said fixture from an open position thereof toward the first-named clamping member to clamp said axially loaded bellows members therebetween and hold the same with said internal diameters in position for being so welded together, indexing said indexible member to cause said fixture thereof to move from a loading station thereof to a welding station thereof adjacent welding means carried by said frame means, and thereafter automatically welding together the internal diameters of said bellows members while said bellows members are disposed at said welding station.

2. A method as set forth in claim 1 wherein said step of automatically welding together said internal diameters of said bellows members comprises the steps of causing relative movement between said fixture and said welding means to position said welding means for welding said internal diameters of said bellows members and causing relative rotational movement between said welding means and said bellows members to weld around the entire internal diameters of said bellows members.

3. A method as set forth in claim 2 wherein said step of causing relative movement between said fixture and said welding means to position said welding means comprises the step of causing a welding torch having a welding tip to move toward said fixture to position said welding tip adjacent said internal diameters of said bellows members.

4. A method as set forth in claim 3 wherein said step of causing relative rotational movement between said welding means and said bellows members comprises the step of rotating said fixture relative to said indexible member and, thus, relative to said welding torch.

5. A method as set forth in claim 1 wherein said step of indexing said indexible member to move said fixture from a loading station thereof to a welding station thereof comprises the stop of rotating said indexible member relative to said frame means.

6. A method as set forth in claim 5 wherein said indexible member is rotated approximately 180° to move said fixture between said loading station and said welding station.

7. A method as set forth in claim 1 and including the step of providing a plurality of said fixtures on said indexible member.

8. A method as set forth in claim 1 and including the step of clamping said bellows members with said clamping members of said fixture adjacent to said internal diameters thereof to hold said bellows members together.

9. A method as set forth in claim 8 wherein said step of clamping said bellows members comprises the step of engaging each of said bellows members with said clamping means substantially completely around the respective bellows member adjacent said internal diameter thereof.

10. A method as set forth in claim 8 and including the steps of moving a plunger of said fixture to a bellows member loading position in said fixture when said fixture is at said loading station whereby said bellows members can be axially inserted on said plunger at the internal diameters thereof, and moving said plunger away from said internal diameters of said bellows members before said welding step and after said clamping step so that said internal diameters can be welded together at said welding station of said fixture.

* * * * *